United States Patent [19]

Jurgens

[11] Patent Number: 5,121,676
[45] Date of Patent: Jun. 16, 1992

[54] BARBECUE GRILL AND COOKER

[76] Inventor: Heinrich J. W. Jurgens, 8114 340th St., East, Eatonville, Wash. 98328

[21] Appl. No.: 699,927

[22] Filed: May 14, 1991

[51] Int. Cl.[5] .............................................. A47J 37/00
[52] U.S. Cl. ........................................ 99/340; 99/446; 99/447; 99/450; 99/482; 126/25 R; 126/41 R
[58] Field of Search ................. 99/339, 340, 444–446, 99/447, 450, 482, 400, 375, 425; 126/25 R, 41 R, 9 R, 9 B

[56] References Cited

U.S. PATENT DOCUMENTS

| | | | |
|---|---|---|---|
| 1,504,102 | 8/1924 | Davis | 99/447 |
| 3,285,239 | 11/1966 | Drake | 99/446 |
| 3,490,357 | 1/1970 | Lescure | 99/446 |
| 3,593,647 | 7/1971 | Copeland, Jr. | 99/339 |
| 3,763,846 | 10/1973 | Schantz | 126/25 R |
| 3,809,053 | 5/1974 | Navarro | 126/9 R |
| 4,403,597 | 9/1983 | Miller | 126/41 R |
| 4,446,846 | 5/1984 | Hahn | 126/25 R |
| 4,662,349 | 5/1987 | McKenzie et al. | 126/41 R |
| 4,683,867 | 8/1987 | Beatty | 99/444 |
| 4,773,319 | 9/1988 | Holland | 99/446 |

FOREIGN PATENT DOCUMENTS 459764 1/1937 United Kingdom ................. 99/446

Primary Examiner—Timothy F. Simone
Attorney, Agent, or Firm—Mark W. Hendricksen

[57] ABSTRACT

A barbecue grill which cooks food at a lower and more evenly distributed temperature and which can be effectively used for a large variety of barbecuing and cooking activity, including cooking meat, fish, vegetables, bread and the like. More particularly, a barbecue grill and cooker including a housing, a hood, a source of heat, a grease deflection and collection system which collects the grease and natural juices for later use without burning them and a heat distribution system that includes a tubular enclosure, multiple distribution conduits and which isolates the source of heat from the environment within the cooking area.

20 Claims, 2 Drawing Sheets

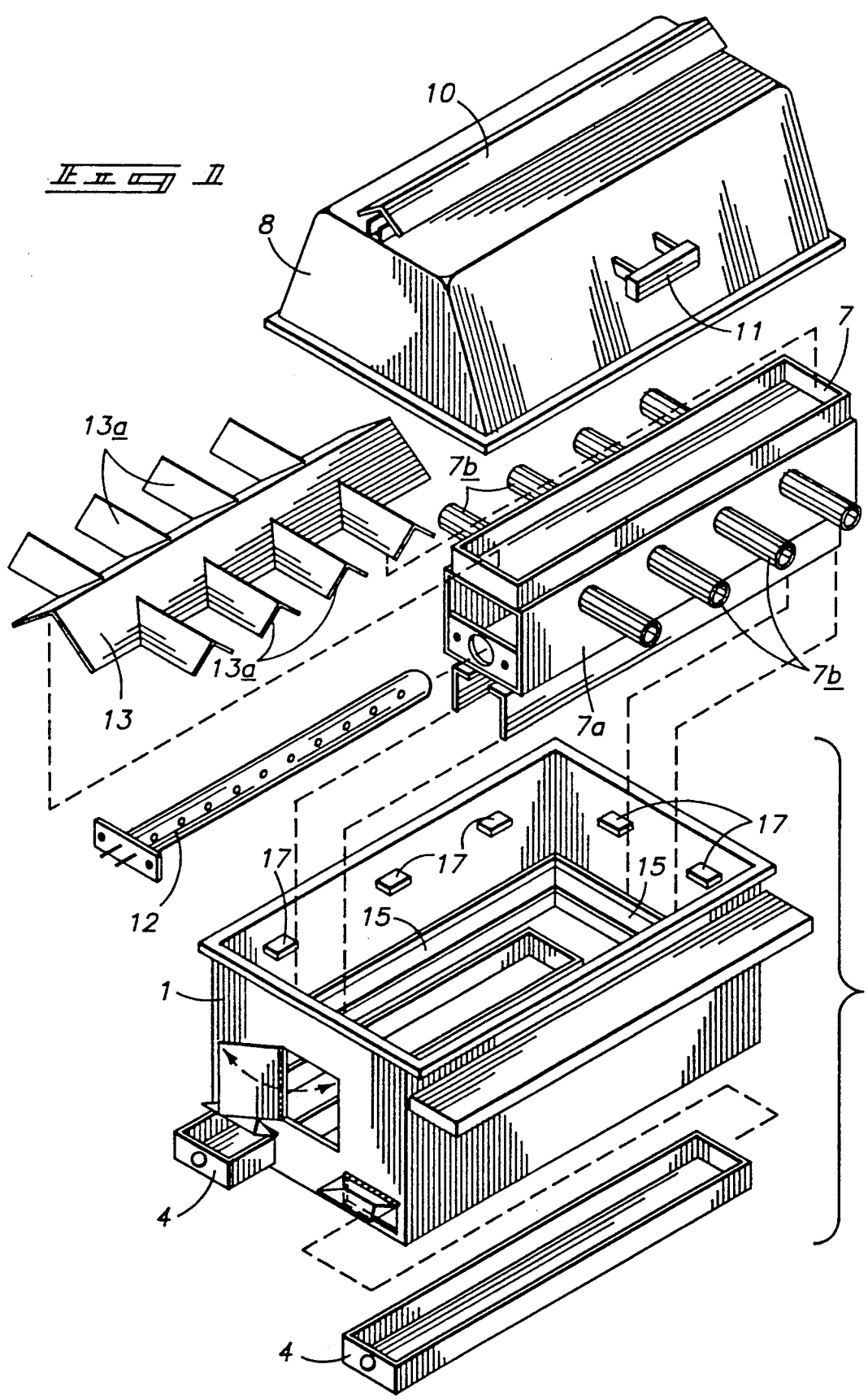

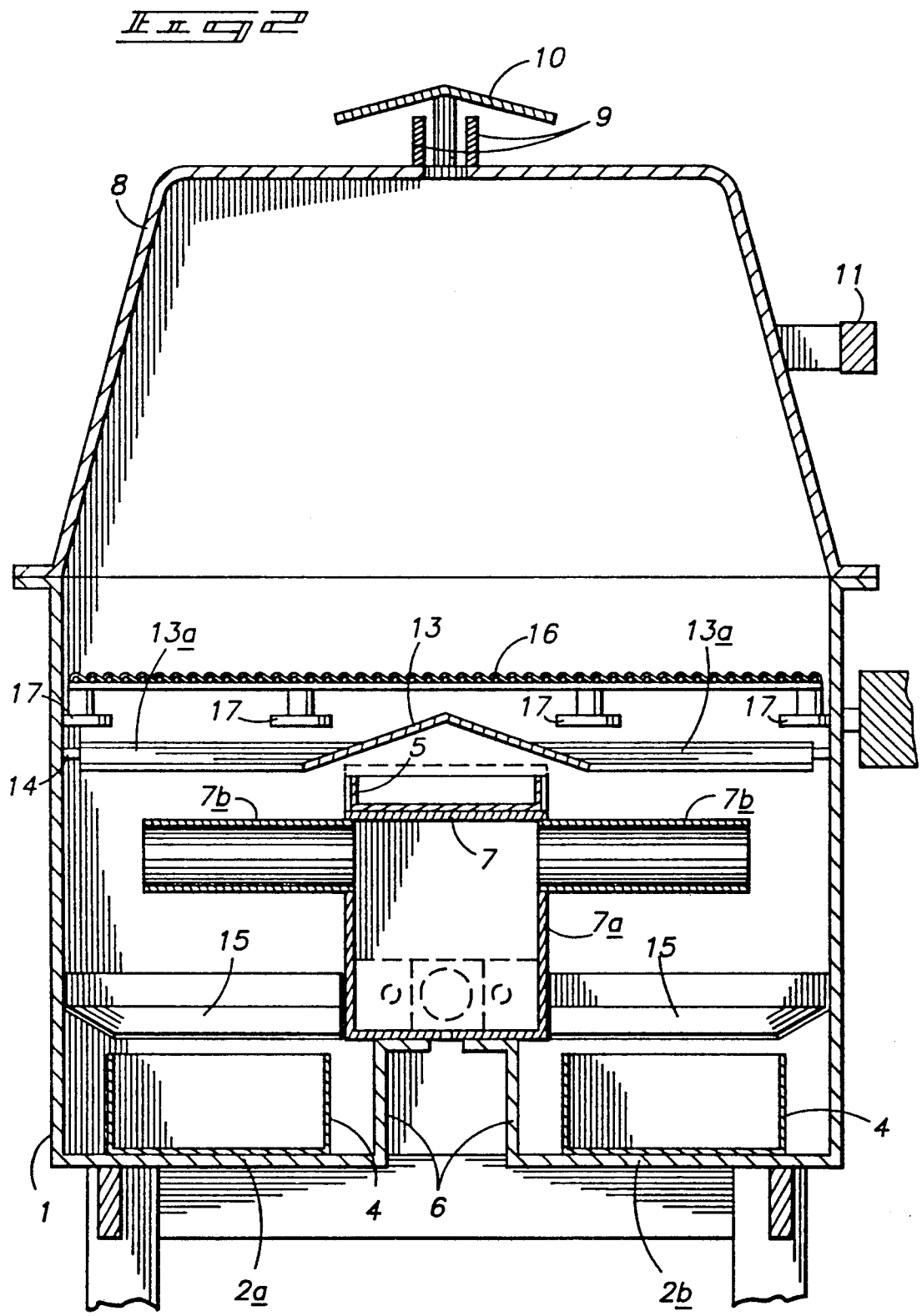

BARBECUE GRILL AND COOKER

FIELD OF THE INVENTION

This invention generally pertains to a barbecue grill and cooker which can also be used as both a steamer and smoker. More particularly, this invention relates to a barbecue grill with a heat distribution means that distributes a lower temperature heat more evenly than achieved by prior art, eliminating grease flaming and resulting in more evenly cooked food which retains more of its natural juices.

BACKGROUND OF THE INVENTION

The use of outdoor gas-fired barbecue grills has substantially increased in recent years. While most barbecue grills burn charcoal briquettes, propane gas fire grills are gaining more and more popularity because they are easier and cleaner to work with and felt to be less expensive to operate long term.

Inventors and manufacturers have been searching for the best means to distribute the high heat potential from the gas heat source to consistently achieve better tasting food. Most grills have multiple burners below a bed of permanent briquettes or some form of metal plate, which are intended to better distribute the high heat.

One of the biggest problems with present grills and prior art is the relatively high cooking temperatures, reaching temperatures of well over three hundred degrees Fahrenheit. Cooking at high temperatures creates hot spots on the grill, results in cooking the food unevenly, results in burning the food, drying the food out and makes it very difficult to cook large pieces of meat, poultry or fish which require a longer cooking time.

While the art attempts to collect and then burn the grease and natural juice drippings to impart a better flavor on the food, it is believed that the better approach is to cook at lower temperatures and thereby retain more of the natural juices and that this results in a better tasting food product.

Recent studies conducted by the American Cancer Society suggest that cooking at high temperatures increases the risk of cancer. The studies indicate that amino acids and creatinine, which are naturally found in animal foods, react during the cooking process to form heterocyclic aromatic amines, which may increase the risk of cancer. The studies further suggest that higher levels of these substances are found when meat is cooked at higher temperatures.

Further, the prior art has heretofore been unable to reduce the energy required to cook food to the same degree that this invention does.

SUMMARY OF THE INVENTION

The barbecue grill contemplated by this invention generally comprises a conventional housing and hood adapted to facilitate this invention's unique features, a heat distribution means which encloses and isolates the heat supply and distributes the heat therefrom evenly to the food and a means to deflect and collect the grease and natural juice drippings from the food.

It is an object of this invention to provide a barbecue grill which safely and efficiently cooks meat, poultry, fish, vegetables and other foods. This object is accomplished through the use of a very efficient heat distribution means which allows these different types of foods to be more evenly cooked at a lower temperature.

It is another object of this invention to provide a barbecue grill which eliminates grease flaming during cooking. This invention eliminates grease flaming by reducing the cooking temperature and isolating sufficiently hot surfaces from the dripping grease and juices by a drip deflection means.

It is another object of this invention to provide a barbecue grill which will collect the grease and natural juice drippings in a removable tray which remains at a sufficiently low temperature such that the drippings can later be used for gravy, sauces and the like. This invention utilizes a deflection system which not only prevents the drippings from hitting a surface hot enough to cause flaming, but is also configured such that the deflected drippings are funneled to removable trays which collect the drippings for later use if desired.

It is another object of this invention to provide a barbecue grill which facilitates the optional addition of wood chips during the cooking process for additional smoke flavor. This invention includes a containment means or tray which rests directly on the heat distribution means and in which wood chips can be placed while cooking and without disturbing the cooking process. This results in the smoking of the food.

It is another object of this invention to provide a barbecue grill which facilitates the optional addition of water during the cooking process to replenish moisture to the food items being cooked for additional tenderness. This invention includes a containment means which rests directly on the heat distribution means and in which water can be placed while cooking and without disturbing the cooking process. This results in the steaming of the food.

It is another object of this invention to provide a barbecue grill which achieves an even application of heat to the food. This object is accomplished through the use of this invention's unique heat distribution means.

It is another object of this invention to provide a barbecue grill which cooks the food in a sufficiently low temperature range such that the amount of potentially harmful compounds are greatly reduced, without taking substantially longer to cook the food. This is accomplished due to the very effective heat distribution means which results in more evenly cooked food cooked at lower temperatures.

It is another object of this invention to provide a barbecue grill which cooks larger pieces of food evenly throughout the food, in a timely manner and without depleting the natural juices of the food being cooked.

It is another object of this invention to provide a barbecue grill which utilizes gas or any other heat source in a highly efficient manner.

It is another object of this invention to provide a barbecue grill in which the source of heat remains efficient and does not require maintenance to maintain said efficiency. This object is accomplished by effectively isolating the source of heat from smoke and grease that may circulate in the cooking area. This invention contemplates that the source of heat is surrounded and effectively isolated from the cooking area by the heat distribution means. The source of secondary combustion air comes from outside and below the housing means and not from or through the cooking area. The air flow through the tubular conduits of the heat distribution means maintains a sufficient velocity such that the smoke and grease are kept away from the source of heat.

It is another object of this invention to provide a barbecue grill which cooks evenly enough and at a low enough temperature to allow it to bake such food items as bread and muffins, which this invention accomplishes.

Other objects, features and advantages of this invention will appear from the specification, claims and accompanying drawings which form a part hereof. In carrying out the objects of this invention, it is to be understood that its essential features are susceptible to change in design and structural arrangement with only one practical and preferred embodiment being illustrated in the accompanying drawings, as required.

BRIEF DESCRIPTION OF THE DRAWINGS

In the accompanying drawings which form a part hereof:

FIG. 1 is an exploded perspective view of one application of the barbecue grill set forth by this invention; and FIG. 2 is cross section view of one the end of application of the barbecue grill set forth by this invention.

DESCRIPTION OF THE PREFERRED EMBODIMENT

The barbecue grill contemplated by this invention generally comprises a conventional housing and hood adapted to facilitate this invention's unique features, a heat distribution means which encloses and isolates the means to supply heat and distributes the heat therefrom evenly to the food and a means to deflect and collect the grease and natural juice drippings from the food.

Many of the fastening and connection means and other components utilized in this invention are widely known and used in the field of the invention described, and their exact nature or type is not necessary for an understanding and use of the invention by a person skilled in the art or science, and they will not therefore be discussed in significant detail.

The various components shown or described herein for any specific application of this invention can be varied or altered as anticipated by this invention. This invention comprises a unique combination of elements, each element of which can be accomplished by one of several different means or variations for a specific application of this invention. The practice of a specific application of any element may already be widely known or used in the art or by persons skilled in the art or science and each will not therefore be discussed in significant detail.

FIG. 1 shows an exploded perspective view of one application of the barbecue grill contemplated by this invention. The barbecue grill includes a housing means 1 which is most preferably made of steel, stainless steel, aluminum or an aluminum alloy. The housing means 1 generally has side walls and a bottom surface comprised of two like and corresponding sides, generally designated by numerals 2a and 2b, and better illustrated in FIG. 2.

FIG. 1 also shows the hood 8 of the barbecue grill, which is generally comprised of four side walls, a top surface and a lifting handle 11. The bottom of the four side walls of the hood 8 is the same approximate size and configuration as the top of the four side walls of the housing means 1 and is pivotally connected thereto by a hinge means to allow easy access to the cooking area by raising the lifting handle 11. When the hood 8 is in the down position, as shown in FIG. 2, it generally seals the cooking area from the outside air.

The top surface of the hood 8 has a slit opening at its center line and generally along its length. The slit opening allows air to exit the cooking area with the least amount of disturbance to the even heat distribution. In order to prevent the entry of water and other unwanted items through the slit opening in the top surface of the hood 8, there is a raised lip contained on the hood 8 and a cover 10 for the slit opening in the hood 8, as shown both in FIG. 1 and in FIG. 2.

It should be noted that this invention contemplates that the air passageway in the hood 8, previously stated to be a slit, can be accomplished a number of different ways, including through a plurality of circular or other shaped holes in the hood 8.

The two bottom surfaces 2a & 2b of the housing means 1 are generally of a split bed configuration to allow for clean secondary air entry from outside and below the housing directly to the means to supply heat 12. Each of the two bottom surfaces 2a & 2b have a raised support lip 6 to facilitate the support of the heat distribution means.

It should be noted that the opening in the bottom surface of the housing means 1 as contemplated by this invention is not limited to a split bed configuration, but can be accomplished by other means to receive secondary combustion air from outside the housing means 1. This may include circular holes along the length of the bottom surface of the housing means 1 which coincide with similarly situated and matching circular holes in the bottom side of the heat distribution enclosure means 7a.

The housing means 1 has two openings at one end to facilitate the insertion and removal of two collection trays 4 which serve as the means to collect the grease and natural grease drippings from the food. The two collection trays 4 are simply constructed with side walls and a bottom surface and are the same general length as the interior of the housing means 1 for effective collection of the drippings.

The heat distribution means shown in FIG. 1 is comprised of a heat distribution enclosure means 7a and multiple thin walled heat distribution conduits 7b, and generally spans the length of the barbecue grill. The cross sectional shape of the heat distribution enclosure means 7a can be different shapes, such as rectangular, square, circular or elliptical, with the current preferred embodiment being of rectangular shape.

The heat distribution means includes multiple thin walled heat distribution conduits 7b on each of the horizontal sides of the heat distribution enclosure means 7a to distribute the heated products of combustion to the sides of the barbecue grill. The cross sectional shape of the heat distribution conduits 7b can be different shapes, such as rectangular, square, circular or elliptical, with the current preferred embodiment being of circular shape. The heat distribution conduits 7b can be welded to the heat distribution enclosure means 7a and are preferably constructed of thin-walled stainless steel.

The heat distribution conduits 7b generally emanate perpendicular from the heat distribution enclosure means 7a and in a horizontal plane. The specific direction the heat distribution conduits 7b are pointed can be altered without deviating from this invention, as long as the products of combustion are directed toward and near the side walls of the housing means 1.

The heat distribution enclosure means 7a is supported by the raised support lips 6 of the bottom surface of the housing means 1. The bottom surface of the heat distribution enclosure means 7a contains multiple openings evenly spaced along its length to allow clean secondary combustion air from outside the barbecue to be induced into the heat distribution enclosure means 7a for use by the burner. It is preferred to have circular-shaped secondary air holes.

FIG. 1 shows a total of eight (8) heat distribution conduits 7b, four (4) on each side of the heat distribution enclosure means 7a. The specific number of heat distribution conduits 7b can be altered without deviating from this invention or its equivalent and can be increased or decreased to facilitate a longer or shorter barbecue grill.

The ends of the heat distribution enclosure means 7a are generally constructed open, with the far end as shown in FIG. 1 being lodged against the end side wall of the housing means 1 and the near end corresponding to the opening in the housing means 1. The near end of the heat distribution enclosure means 7a is configured to facilitate the removal, insertion and support of the means to supply heat 12.

The housing means 1 also has an opening at one end to facilitate the insertion and removal of a tray containment means 5 in which water, wood chips and/or other items can be placed to be heated to affect the environment in which the food is cooked, and thereby affect the taste of the food. The tray containment means 5 rests on and is supported by the top outer surface of the heat distribution enclosure means 7a, allowing it to conductively receive heat from the heat distribution enclosure means 7a to vaporize added water or to cause the added wood chips to smoke. This tray containment means 5 is simply constructed with side walls and a bottom surface and is the same general length as the interior of the housing means 1. The insertion and removal of the tray containment means 5 can easily be made during and without disturbing the cooking process.

The opening at the near end of the housing means 1 as shown both in FIG. 1 and in FIG. 2 facilitates the insertion and removal of both the tray containment means 5 and the means to supply heat 12. The means to supply heat 12 shown in the drawings is generally of tubular shape, can readily be purchased in the industry and spans the length of the barbecue grill.

The means to supply heat 12 is connected to a conventional propane gas tank (not shown) by a convention gas line (not shown). It should be noted that means to supply heat other than propane gas can be utilized as contemplated by this invention, such as an electrical resistance heating means or charcoal briquettes. The propane gas means to supply heat 12 and the electrical resistance means to supply heat will take essentially the same form as shown on the drawings. Further, the charcoal briquette means to supply heat would merely take the place of the other two options, would be located in the same location and are so well known in the art as a means to supply heat that their furthei description is not necessary.

FIG. 1 also shows a removable grease drip deflection means 13 which is supported above the heat distribution enclosure means 7a and conduits 7b by supports 14 connected to the inside of the side walls of the housing means 1. The drip deflection means 13 is configured to be suspended directly above and to deflect grease and natural juice drippings away from the heat distribution enclosure means 7a and conduits 7b and into the collection trays 4. The drip deflection means 13 is sized and positioned such that the drippings will not land on the heat distribution enclosure means 7a or the heat distribution conduits 7b.

Each component of the drip deflection means 13 is configured to facilitate deflection of the drippings on both sides of each part of the heat distribution housing and conduits, comprising corresponding sloped sides. FIG. 1 shows a drip deflection means 13 with eight (8) total deflection fins 13a to protect each of the eight (8) heat distribution conduits 7b. It should be noted that this invention contemplates that the specific shape of the drip deflection means 13 can be altered to such shapes as semi-circles, without deviating from this invention, with the preferred embodiment being shown in the accompanying drawings and described herein.

FIG. 1 and FIG. 2 also show interior housing deflectors 15 which skirt the entire interior perimeter of the housing means 1. The housing deflectors 15 are connected to the interior side walls of the housing means 1 and angle away from the side walls of the housing means 1. The housing deflectors 15 are configured such that grease and juice drippings along or near the interior perimeter of the housing means 1 will be deflected inward such that the drippings fall into one of the two collection trays 4.

FIG. 2 shows the grill 16 suspended horizontally above the heat distribution enclosure means 7a by supports 17 attached to the interior of the side walls of the housing means 1. The grill 16 is generally positioned vertically below the vertical level where the top of the housing means 1 and the hood 8 meet. This allows for more clearance under the hood for the cooking of larger food items such as turkeys and reduces the amount and effect of cold air induced in through the slight crack opening between the housing means 1 and the hood 8.

This invention is designed to totally eliminate flaming during cooking. The unusually even distribution of heat over the entire area of the grill 16 and the relatively low cooking temperature facilitated thereby permit the cooking of larger pieces of meat such as ham, turkey, roasts and the like. Primary and secondary combustion air only enter the heat distribution enclosure means 7a and does not enter into the cooking area. In other grills in the art, air allowed to enter the cooking area creates cold spots, uneven heat distribution and consequent cooking problems.

While the preferred embodiment for the invention has been described in detail, those familiar with the art to which this invention relates will recognize various alternative designs and embodiments for carrying out the invention, as defined by the claims which follow.

The invention claimed is:

1. A barbecue grill for cooking food, comprising:
   (a) a housing means having side walls and a bottom surface;
   (b) a hood adapted to enclose said housing means;
   (c) a heat distribution means spanning the approximate length of said housing means and positioned at or near the lengthwise center line of said housing means, and comprised of:
      (i) a tubular heat distribution enclosure means configured relative to one or more openings in the bottom surface of said housing means and with one or more corresponding openings on its bottom surface such that it can receive secondary combustion air from outside the housing means; and (ii) a plurality of heat distribution conduits connected to and pointed outward from said heat distribution enclosure means on or about a horizontal plane such that the heated air from within the heat distribution enclosure means can flow through said heat distribution conduits and into the interior of said housing means;

(d) a means to supply heat to the interior of said tubular heat distribution enclosure means;

(e) a drip deflection means which prevents grease and juices from the food from dripping on the heat distribution enclosure means and from dripping on the plurality of heat distribution conduits;

(f) a removable drip collection means positioned below and relative to said drip deflection means to collect the drippings from the food; and (g) a means to support the food within said housing means in a horizontal plane.

2. A barbecue grill as recited in claim 1 and which further comprises a tray containment means with four sides and a bottom surface which runs the approximate length of the housing means, which is conductively associated with the heat distribution enclosure means and which will contain water, wood chips and other items which may affect the cooking of the food.

3. A barbecue grill as recited in claim 2 and in which the exterior of the bottom surface of said tray containment means rests on and is supported by said heat distribution enclosure means.

4. A barbecue grill as recited in claim 1 and in which the means to supply heat to the interior of the heat distribution enclosure means comprises charcoal briquettes.

5. A barbecue grill as recited in claim 1 and in which the means to supply heat to the interior of the heat distribution enclosure means comprises a gas burner assembly.

6. A barbecue grill as recited in claim 1 and in which the means to supply heat to the interior of the heat distribution enclosure means comprises an electric resistance heat source.

7. A barbecue grill as recited in claim 1 wherein said housing means is supported by a plurality of legs.

8. A barbecue grill as recited in claim 1 wherein said hood is pivotally attached to said housing means such that it can be opened by lifting upward on a handle.

9. A barbecue grill as recited in claim 1 wherein said tubular heat distribution enclosure means is rectangular in its cross-sectional shape.

10. A barbecue grill as recited in claim 1 wherein said tubular heat distribution enclosure means is square in its cross-sectional shape.

11. A barbecue grill as recited in claim 1 wherein said tubular heat distribution enclosure means is circular in its cross-sectional shape.

12. A barbecue grill as recited in claim 1 wherein said tubular heat distribution enclosure means is elliptical in its cross-sectional shape.

13. A barbecue grill as recited in claim 1 wherein said heat distribution conduits are circular in their cross-sectional shape.

14. A barbecue grill as recited in claim 1 wherein said heat distribution conduits are elliptical in their cross-sectional shape.

15. A barbecue grill as recited in claim 1 wherein said heat distribution conduits are rectangular in their cross-sectional shape.

16. A barbecue grill as recited in claim 1 wherein said heat distribution conduits are square in their cross-sectional shape.

17. A barbecue grill as recited in claim 1 wherein said drip deflection means is comprised of:

(a) planar surfaces sloping downwardly from their point of attachment around the interior perimeter of the housing means at a vertical elevation below said means to support the food and which deflects the food drippings into one or more collection trays; and (b) a covering which overlaps the approximate top view of the heat distribution enclosure means and the heat distribution conduits and which has downwardly sloping sides such that food drippings falling on it are deflected into one or more collection trays.

18. A barbecue grill as recited in claim 1 wherein said grease collection means is comprised of two trays running the approximate length of the housing means, said collection trays comprised of side walls and a bottom surface.

19. A barbecue grill as recited in claim 18 wherein said collection trays are removable from the interior of the housing means through a port such that neither removal nor insertion disturb the cooking process.

20. A barbecue grill as recited in claim 1 wherein the means to support the food within said housing means is vertically positioned below the upper edge of the housing means.

* * * * *